June 11, 1935.  E. S. JOHNSON  2,004,872

GAS TANK ALARM

Original Filed Feb. 9, 1932

Inventor
Edward S. Johnson.
By
D. H. Bryant.
Attorney

Patented June 11, 1935

2,004,872

UNITED STATES PATENT OFFICE 2,004,872

GAS TANK ALARM

Edward S. Johnson, Seven Mile, Ohio

Application February 9, 1932, Serial No. 591,891.
Renewed November 16, 1934

1 Claim. (Cl. 177—314)

This invention relates to certain new and useful improvements in gas tank alarms.

The primary object of the invention is to provide an alarm attachment for the gas tank of an automobile that is associated with the cap of the gas tank and the automobile horn or other signal device and operative to sound an alarm upon removal of the gas tank cap to give warning of unauthorized removal of the cap and to prevent theft of gasoline from the tank.

A further object of the invention is to provide a gas tank alarm of the foregoing character wherein the alarm mechanism may be associated with a gas tank cap of either the spring lock or screw type for the sounding of an alarm upon unauthorized removal of the gas tank cap.

With the above and other objects in view that will become apparent as the nature of the invention is better understood, the same consists in the novel forms, combination and arrangement of parts hereinafter more fully described, shown in the accompanying drawing and claimed.

In the drawing:—

Figure 1:
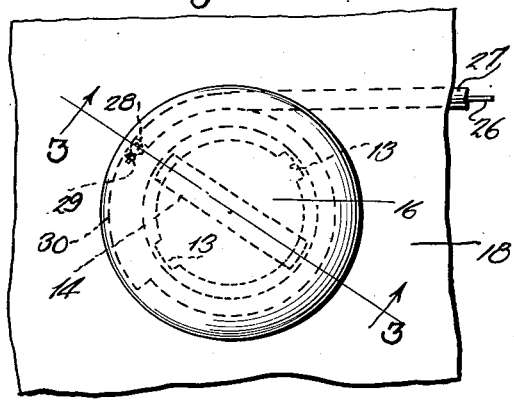
Figure 1 is a fragmentary top plan view of the gas tank provided with a spring closure cap and showing a part of the alarm operating means attached to the cap.

Referring more in detail to the accompanying drawing, and particularly to Figures 1 to 4, the reference numeral 10 designates the gas tank of an automobile provided with a filling opening surrounded by an upstanding neck 11, inwardly flanged as at 12 and with diametrically opposite slots 13 in the flange to receive the ends of a spring arm 14 centrally connected as at 15 to the lower face of the closure cap 16. The lower face of the closure cap is provided with an annular groove having a calk or other filling 17 that is engaged with the upper edge of the neck 11 to form a tight seal when the cap 16 is rotated to displace the ends of the spring arm 14 out of registration with the flanged notches 13.

The tank 13 has a cover wall 18 spaced therefrom and said cover wall is provided with a relatively large opening 19 overlying the filler neck 11 to permit the mounting of the closure cap upon the neck of the tank.

Figure 4:
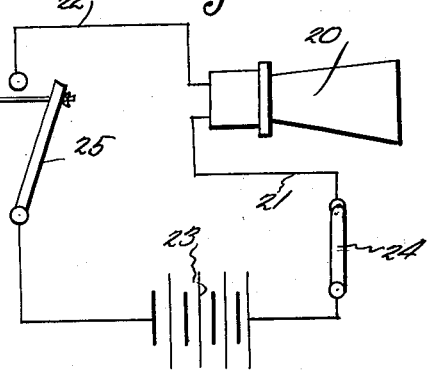
Figure 4 is a diagrammatic view of the alarm mechanisms.
Figure 2:
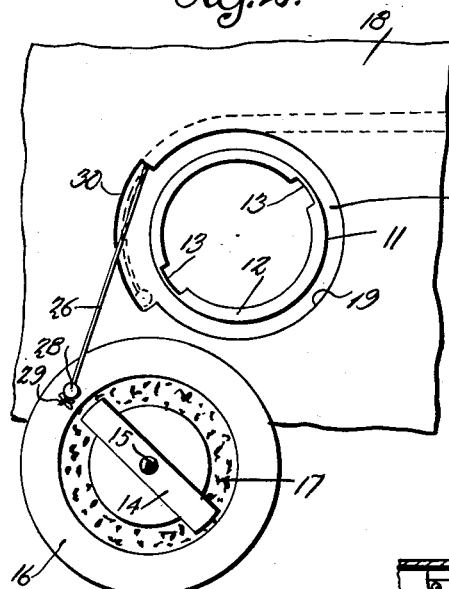
Figure 2 is a fragmentary top plan view with the tank cap removed to show the connection between the cap and alarm operating means.

The alarm mechanism as illustrated in Figure 4 comprises the automobile horn 20 having circuit wire connections 21 and 22 with the end terminals of the battery 23, a manually operable switch 24 being set in the wire 21 while an automatically operated switch 25 is set into the wire 22.

Figure 3:
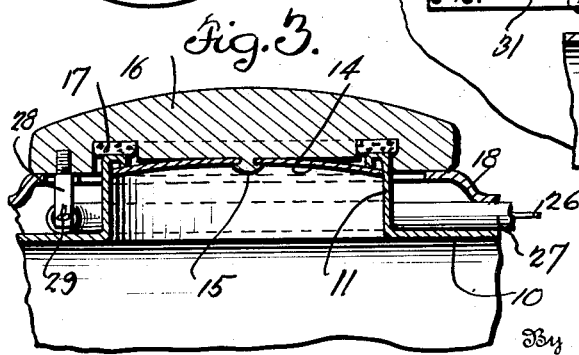
Figure 3 is a vertical cross-sectional view taken on line 3—3 of Figure 1, showing a conduit between the gas tank and tank cover for housing a pull cord for the alarm mechanism that is attached to the closure cap.

The free swinging end of the automatically operated switch arm 25 has one end of a pull cord 26 attached thereto, said switch arm 25 being tensioned and normally inoperatively positioned, the pull cord 26 extending through a tubular conduit 27 that is located between the gas tank 10 and cover 18 to be hidden from view and terminating adjacent the tank neck 11 as shown in Figures 1 and 3. A pin 28 depending from the peripheral edge of the tank cap 16 has the adjacent end of the pull cord 26 extending outwardly of the conduit 27 attached thereto as at 29, the tank cover 18 having an arcuate cut away portion 30 in the edge of the opening 19 to accommodate movement of the pin 28 as will at once be understood from an inspection of Figures 2 and 3 of the drawing.

When the tank cap 16 is in closed position upon the filler neck 11, the pin 28 is disposed adjacent the end of the conduit 27 with the automatic switch 25 spaced from its contact. Upon rotation of the cap 16 to disengage the same from the tank neck 11, a pull is exerted upon the cord 26 for automatically closing the switch 25 to sound the alarm 20, thus giving a signal that some one without authority is removing the tank cap. The switch 24 may be manually operated for rendering the alarm means ineffective so that the tank cap may be removed for such purposes as re-filling the tank without sounding an alarm.

Figure 5:
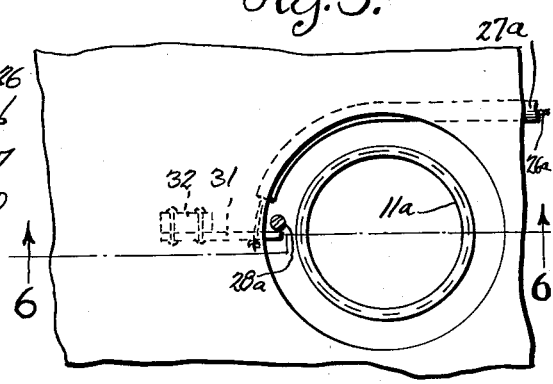
Figure 5 is a fragmentary top plan view with the tank cap removed showing a screw type of tank filler neck.
Figure 6:
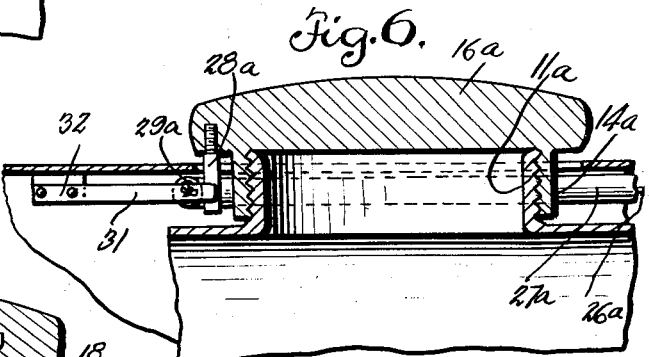
Figure 6 is a vertical sectional view taken on line 6—6 of Figure 5, showing the screw cap and alarm devices associated therewith.

In the form of the invention illustrated in Figures 5 and 6, a screw type tank cap is shown, the neck 11a being externally threaded to receive the internally threaded depending annular flange 14a carried by the closure cap 16a. The end 29a of the pull cord extending through the conduit is attached to a supporting arm 31 secured at one end as at 32 to a block depending from the tank cover 18 while the pin 28a depending from the cap 16a successively engages the free end of the spring arm 31 during unscrewing operation thereof for removal so that an alarm is intermittently sounded.

While there are herein shown and described the preferred embodiments of the invention, it is nevertheless to be understood that minor changes may be made therein without departing from the spirit and scope of the invention as claimed.

I claim:—

A gas tank alarm comprising a gas tank and a rotatable closure cap, an electric alarm and control switch therefor, pull cord operating means for the control switch connected to the switch, operative connections between the pull cord and tank cap, including a spring arm to which the pull cord is attached, a pin carried by the cap movable in a path upon rotary movement of the cap to operate the spring arm for sounding the alarm, a cover wall for the tank spaced therefrom and having an opening therein overlying the closure cap opening and an arcuate recess in the edge wall of the cover wall opening providing clearance for movement of the pin carried by the closure cap.

EDWARD S. JOHNSON.